(12) United States Patent
Harmgardt et al.

(10) Patent No.: US 8,004,210 B2
(45) Date of Patent: Aug. 23, 2011

(54) LED REPLACEMENT FOR LOW VOLTAGE LAMPS

(76) Inventors: Hans L. G. Harmgardt, Mississauga (CA); Jonathan Wylde, Mississauga (CA)

( * ) Notice: Subject to any disclaimer, the term of this patent is extended or adjusted under 35 U.S.C. 154(b) by 0 days.

(21) Appl. No.: 12/901,407

(22) Filed: Oct. 8, 2010

(65) Prior Publication Data

US 2011/0127913 A1 Jun. 2, 2011

Related U.S. Application Data

(63) Continuation-in-part of application No. 12/154,000, filed on May 28, 2008, now Pat. No. 7,812,550.

(51) Int. Cl.
*H05B 37/02* (2006.01)
(52) U.S. Cl. ........ 315/291; 315/246; 315/309; 362/543; 362/800
(58) Field of Classification Search ............... 315/50, 315/51, 200 R, 224, 246, 247, 272, 276, 291, 315/307–309, 312; 362/227, 235, 240, 241, 362/543–546, 800
See application file for complete search history.

(56) References Cited

U.S. PATENT DOCUMENTS

| | | | |
|---|---|---|---|
| 5,661,645 A * | 8/1997 | Hochstein | 363/89 |
| 6,211,626 B1 | 4/2001 | Lys et al. | |
| 6,515,437 B1 | 2/2003 | Zinkler et al. | |
| 6,600,667 B2 | 7/2003 | Francescutti et al. | |
| 6,717,374 B2 | 4/2004 | Krummel | |
| 6,836,081 B2 * | 12/2004 | Swanson et al. | 315/307 |
| 6,914,394 B2 | 7/2005 | Weirich | |
| 7,358,679 B2 * | 4/2008 | Lys et al. | 315/51 |
| 7,390,115 B1 * | 6/2008 | Huang et al. | 362/542 |
| 2002/0097008 A1 | 7/2002 | Krummel | |
| 2002/0154521 A1 | 10/2002 | Francescutti et al. | |
| 2004/0189555 A1 | 9/2004 | Capen et al. | |
| 2004/0263091 A1 | 12/2004 | Deurloo et al. | |
| 2005/0253533 A1 | 11/2005 | Lys et al. | |

* cited by examiner

*Primary Examiner* — Jacob Y Choi
*Assistant Examiner* — Jimmy T Vu
(74) *Attorney, Agent, or Firm* — Richard C. Litman

(57) ABSTRACT

The LED replacement for low voltage lamps has a plurality of LED lights disposed in a housing capped by a multifaceted reflector to provide lighting having comparable lighting characteristics to non-LED sourced low voltage lamps. Power conditioning solid state circuitry is disposed in the housing and provides the LED lights with a regulated excitation voltage source. The power conditioning circuitry has at least one ceramic capacitor in parallel with output leads of a power supply for the lamp. A zener diode pair having anodes connected together is disposed in parallel with the ceramic capacitor. The power conditioning circuitry is disposed in advance of a voltage rectifier and filter bank, whose output is provided to a voltage regulator that provides regulated DC voltage to the LED light sources. Output of the voltage regulator is modulated by thermal protection circuitry that throttles the LEDs off responsive to lamp overheating.

13 Claims, 5 Drawing Sheets

LED REPLACEMENT FOR LOW VOLTAGE LAMPS

CROSS-REFERENCE TO RELATED APPLICATION

This application is a continuation-in-part of U.S. patent application Ser. No. 12/154,000, filed May 28, 2008 now U.S. Pat. No. 7,812,550.

BACKGROUND OF THE INVENTION

1. Field of the Invention

The present invention relates to electrical appliances, and more specifically to an LED replacement for low voltage lamps that can function as a replacement for a low voltage lamp, such as an MR16 halogen lamp.

2. Description of the Related Art

"MR" stands for multifaceted reflector, a pressed glass reflector with the inside (reflecting side) surface composed of facets and covered by a reflective coating. The facets provide optical control by gathering the light from the filament to create a concentrated beam of light. The reflectors of some MR lamps have a smooth inside surface instead of facets however they are typically still called MR lamps. The typical MR lamp has a single-ended quartz halogen filament capsular light source that is typically powered by a transformerless, electronic power supply. The electronic power supply should be designed to accommodate typical MR-16 lamp power ratings, which may range from 10 to 100 watts, depending on the lighting application. MR-16 lamps are generally operated using voltages lower than 120 volts, nominally 12 volts. However, it is not uncommon to find an MR-16 lamp having an operational voltage of 6 or 24 volts. A switching power supply is needed to reduce the line voltage from 120 or 240 volts to the appropriate level for these lamps. Most MR-16 low-voltage lamps are equipped with a base having two electrical contact pins. However, other bases, such as the bayonet style or turn and lock style, may be utilized.

Typically low voltage lighting utilizes a step down magnetic transformer that operates on 120 volts AC and produces an output of approximately 12 volts AC at approximately 60 Hz. This frequency allows the LEDs to operate without causing a visible flicker in their output. However, in the event that a transformerless switching power supply is used, problems arise, in that an electronic transformer generally has an oscillator that requires a load in the output before it will switch on and produce current to the output. This load varies with the design of the electronic transformer, but is typically set at 8-10 watts. If the transformer does not sense the load to be at this level, the transformer will fail to start. Typically, LED-based replacement light sources present a load to the transformer that is ten percent of the transformer rating, which is below the transformer "ON" set point. Moreover, the output frequency that the switching power supply oscillator is set to may be many times higher than the standard 60 Hz line frequency that a magnetic transformer provides. The frequency is high enough that it produces harmonics in the drive circuitry of the LED light source. Since LEDs have an 8-10 nanosecond rise time, these harmonics are of sufficient amplitude to effectively turn the LEDs on and off at a frequency that is a subharmonic of the oscillator frequency, thereby causing the LED source to flicker at a rate that becomes obvious to a person viewing the light.

Attempts have been made to replace the halogen light source of MR-16 and other low voltage lamps with an LED (light emitting diode) light source. The aforementioned common problem encountered when an LED light source is utilized is that the LED's do not draw enough current to activate the switching power supply. Also switching power supplies may from time to time output transient spikes of voltage that may damage the delicate LED sources in an LED replacement lamp.

Thus, an LED replacement for low voltage lamps solving the aforementioned problems is desired.

SUMMARY OF THE INVENTION

The LED replacement for low voltage lamps provides a light emitting diode (LED) replacement for the typical low voltage lamp with a halogen or other non-LED light source. The LED replacement for low voltage lamps has a typical low voltage form factor that comprises a plurality of LED lights disposed in a housing capped by a multifaceted reflector to provide lighting having comparable lighting characteristics to the non-LED sourced low voltage lamps. Power conditioning solid-state circuitry is disposed in the housing and provides the LED lights with a regulated excitation voltage source. The power conditioning circuitry is comprised of at least one ceramic capacitor in parallel with output leads of a power supply for the lamp. Preferably a pair of zener diodes having their anodes connected together is disposed in parallel with the ceramic power conditioning capacitor. The power conditioning circuitry is disposed in advance of a voltage rectifier and filter bank, whose output is provided to a voltage regulator that provides regulated DC voltage to the LED light sources. Output of the voltage regulator may be modulated by thermal protection circuitry that throttles the LEDs dimmer or off, depending on temperature inside the lamp housing.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
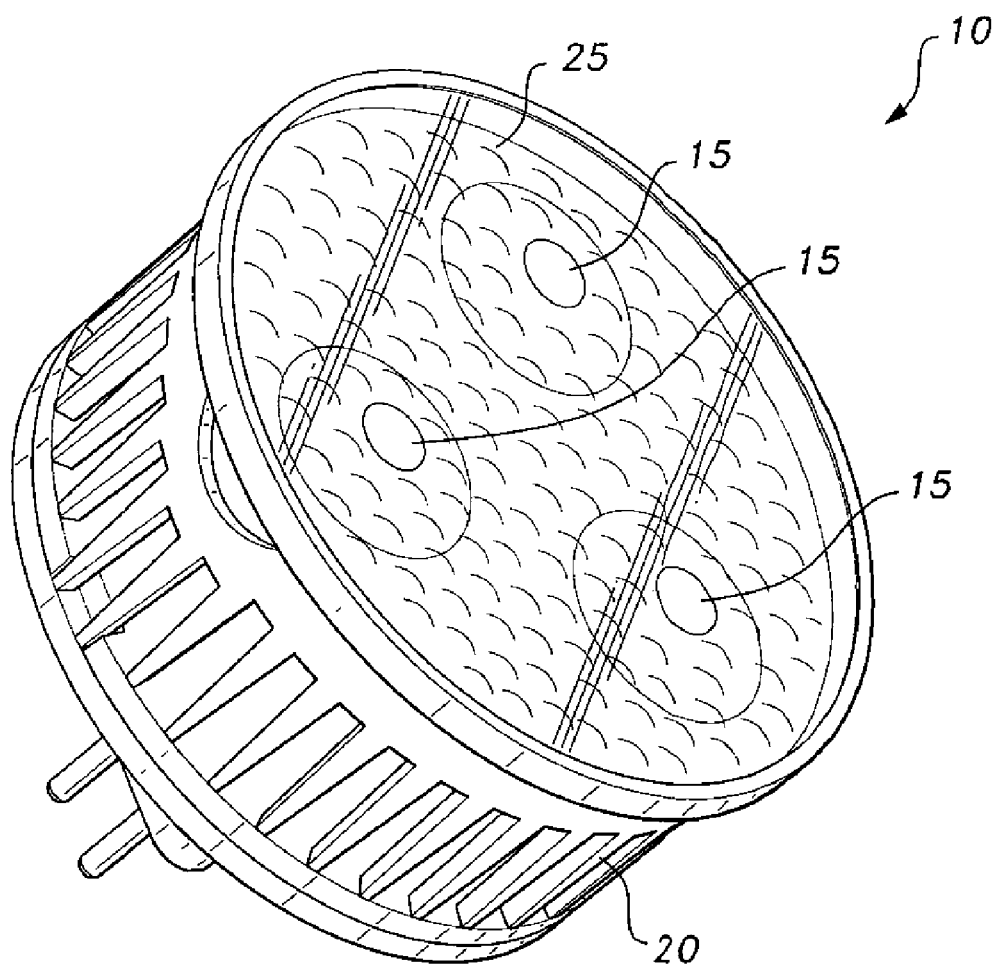
FIG. 1 is a perspective view of an LED replacement for low voltage lamps according to the present invention.
Figure 2:
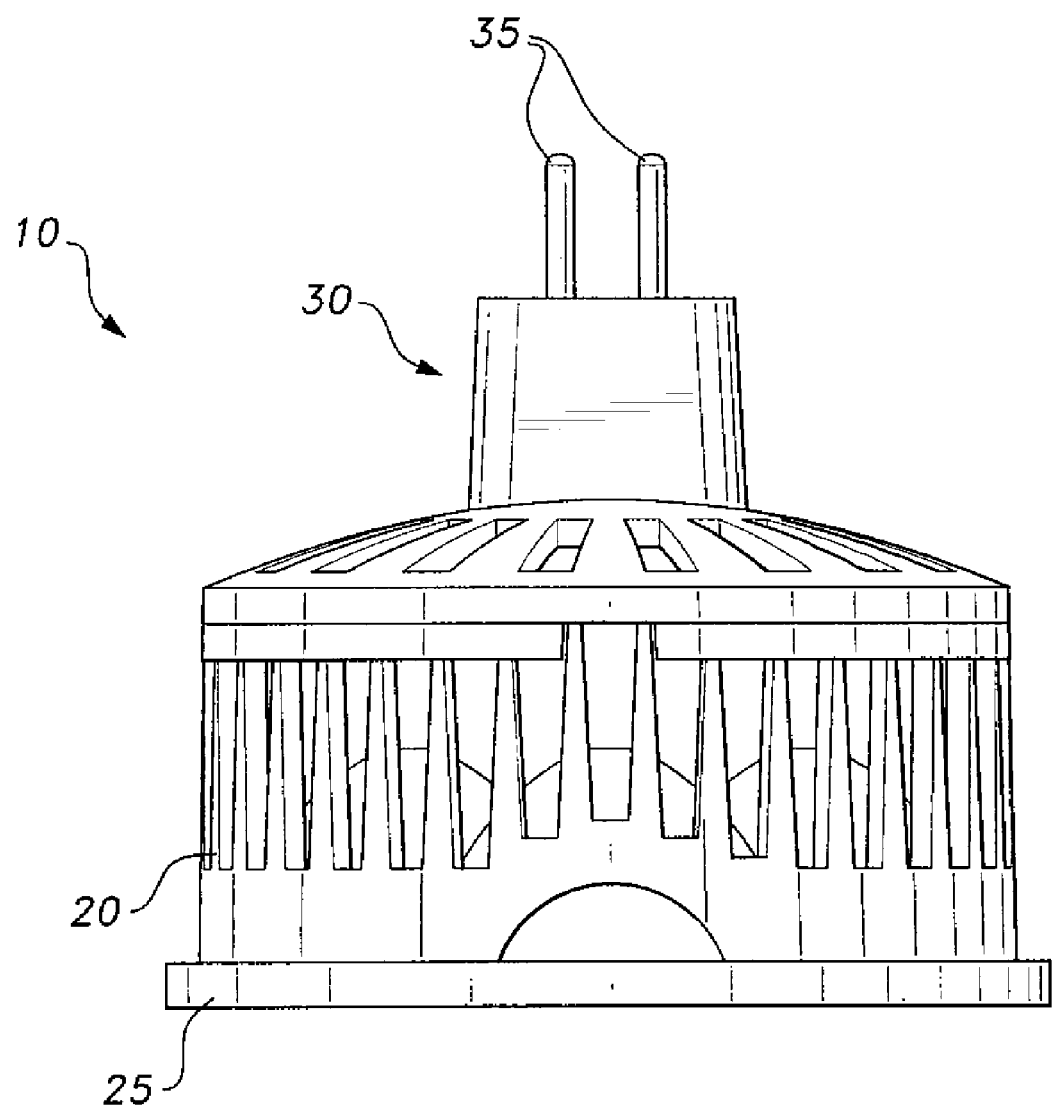
FIG. 2 is a plan view of a LED replacement for low voltage lamps according to the present invention.

As shown in FIGS. 1-4, the present invention provides an LED replacement for low voltage lamps. The LED replacement for halogen reflector replacement 10 has a typical low voltage bulb form factor that comprises a plurality of LED lights 15 disposed in a housing 20 capped by a multifaceted reflector 25 to provide lighting having comparable lighting characteristics to the halogen sourced lamps. The LED replacement 10 has a base 30 from which two electrical contact prongs 35 extend.

Figure 4:
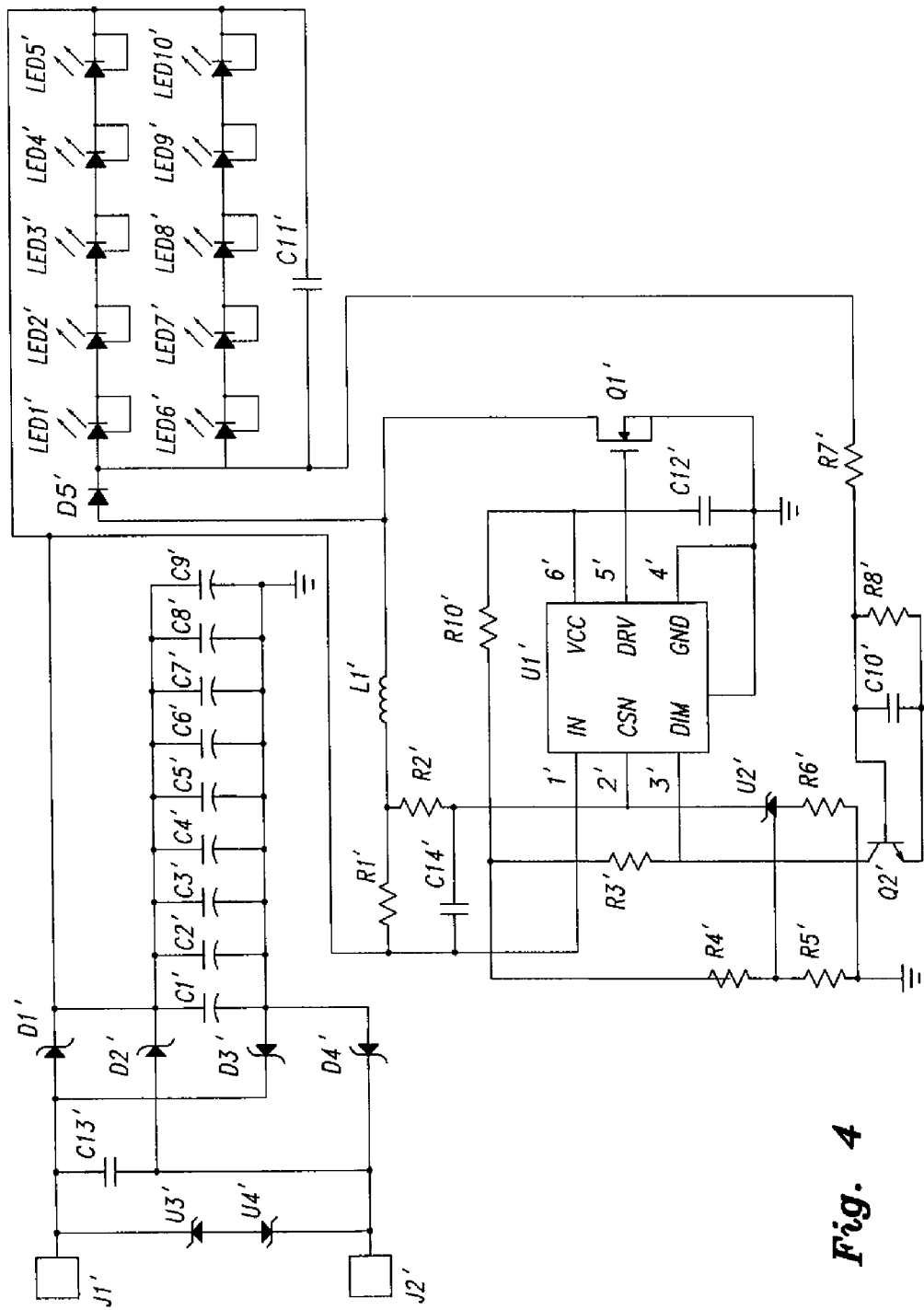
FIG. 4 is a schematic diagram of a second embodiment of driver circuitry for an LED replacement for low voltage lamps according to the present invention.

Power conditioning solid state circuitry 305 and power regulation circuitry 310 are disposed in the housing and provide the LED lights with a regulated excitation voltage source. The power conditioning circuitry 305 is comprised of at least one ceramic capacitor C5 in parallel with output leads J1 and J2 of an exemplary 12-volt AC power supply for the replacement 10. C5 is preferably ceramic in order to provide a Mean Time Between Failure (MTBF) of the same order of magnitude as MTBF (approximately 50,000+ hours) for typical LED bulbs LED1-LED3. A preferable range of values for capacitor C5 is between 0.015 uF at approximately a 50-volt rating. As shown in FIG. 4, an alternative embodiment provides a pair of zener diodes U3' and U4' having their anodes connected together and disposed in parallel with a ceramic power conditioning capacitor C13'. Preferably the zener clipping voltage is set to approximately 19 volts. A preferable range of values for capacitor C13' is between 0.015 uF at approximately a 50-volt rating.

Figure 3:
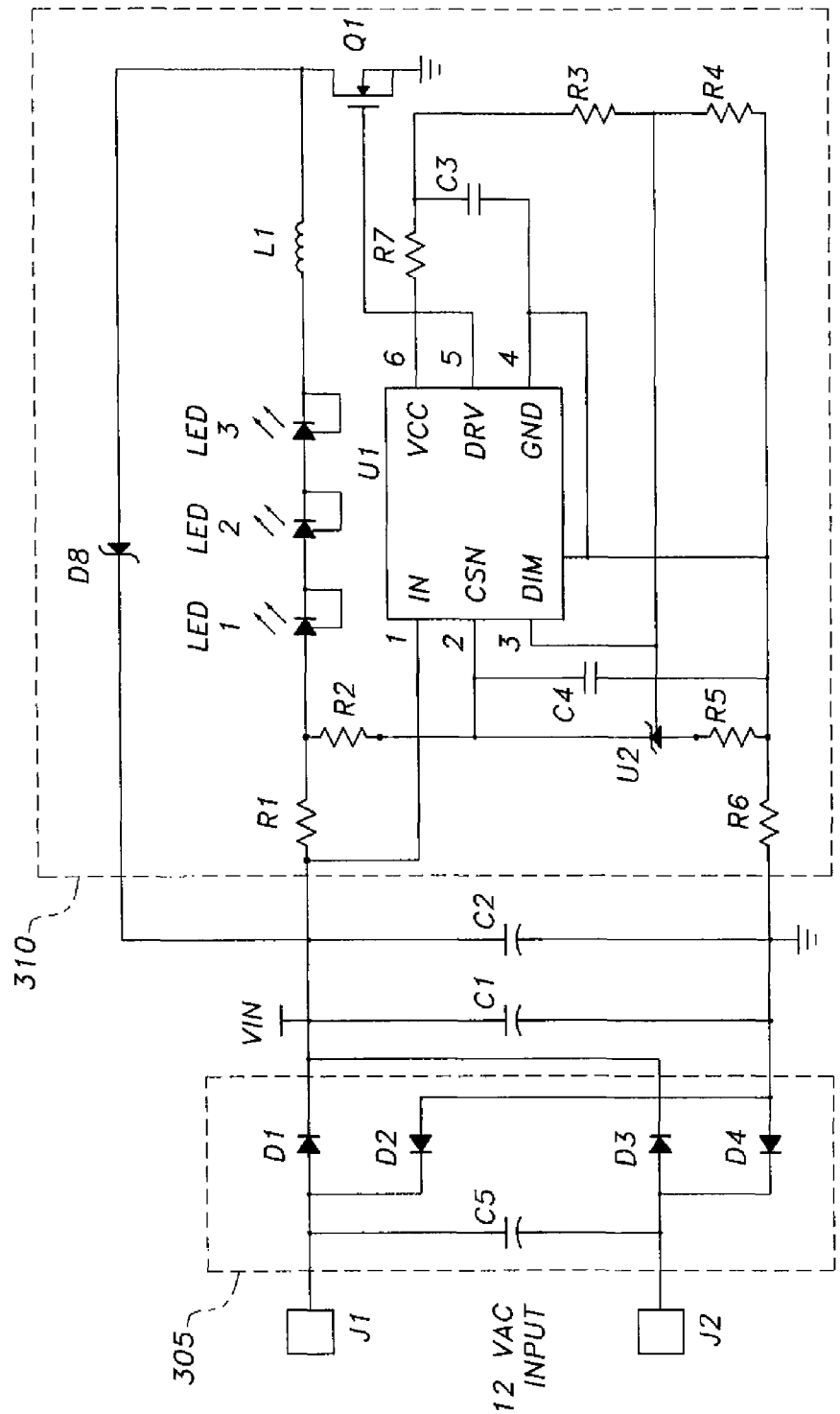
FIG. 3 is a schematic diagram of a first embodiment of driver circuitry for an LED replacement for low voltage lamps according to the present invention.

Referring to FIG. 3, the power conditioning circuitry may include a preferably full-wave voltage rectifier comprised of diodes D1, D2, D3, and D4, the voltage rectifier being connected to a filter bank comprised of capacitors C1 and C2, which smooth the DC voltage output provided to voltage regulating LED driver circuitry U1, which, in turn, energizes DC LED light sources 15 (LED1 LED2 and LED3). An exemplary driver U1 may be a Maxim MAX 16820 that provides approximately 2 MHz high-brightness LED drivers having high-side current sense and approximately 5000:1 dimming. YIN of the rectifier output is connected to the IN terminal (pin 1) of driver U1. Preferably driver U1 can provide an approximately 5-volt regulated output for VIN input voltages ranging from approximately 4.5 to approximately 28 volts.

The output of voltage regulating LED driver circuitry U1 may be modulated by thermal protection circuitry (R3 is a positive temperature coefficient thermistor and is in a series divider circuit with resistor R4), which throttles charge to capacitor C4 at dimming input DIM (pin 3) of U1 to the LEDs, LED 1, LED 2, and LED 3, via shunt regulator U2 to gradually dim and turn off the LEDs when temperature inside the lamp housing 20 exceeds a predetermined safe threshold temperature. Preferably the power throttling back is set to begin at approximately 60° C. and the throttling back gradient is set to cut the power by 50% at approximately 73° C. (or 85% of the maximum allowable temperature) to prevent thermal damage of the lamp system 10 due to unforeseen conditions. The power may be throttled back by either pulse width modulation (PWM) means or linear means. Set point of U2 is determined by resistors R5 and R6 in relation to thermistor R3 and R4.

Forward bias of shunt regulator U2 is provided by the series combination of resistors R1 and R2, R1 being directly connected to the plus side VIN of the filtered DC voltage. Shunt regulator output U2 is connected to the CSN (current sense pin 2) input of regulator/LED driver U1. Regulator/LED driver U1 output DRV (pin 5) is routed to gate of N channel MOSFET Q1, the output of which feeds Schottky diode D8 to provide a regulated input voltage VIN for the LEDs. While a standard diode may be used for D8, a Schottky diode is preferred because of its lower forward voltage drop, i.e., approximately 0.25 $V_f$ for the Schottky diode versus approximately 0.6 $V_f$ for a standard diode.

The voltage drop at series connected resistors R1 and R2 provides regulated DC voltage to the plurality of LEDs, LED1, LED2, and LED3. Resistor R7 and capacitor C3 provide adequate isolation of VCC (pin 6) from ground (pin 4) on regulator/driver chip U1. Inductor L1 functions in conjunction with filter capacitors C1-C2 to provide additional DC ripple filtering. However, since L1 is disposed between LED3 and Q1, the inductance value may be reduced to approximately 50 µH, thereby maintaining a miniature form factor that is compatible with the MR-16 lamp form factor.

Referring again to FIG. 4, it is shown that the present invention may be scaled up to accommodate an even greater plurality of LED lights, such as the 10 LED array comprised of LED1' through LED10'. As discussed in detail supra, transient limiting zener diodes U3' and U4' are disposed in parallel with ceramic power conditioning capacitor C13'. C13', like C5 of FIG. 3, provides a path for high frequency components of an electronic switching power supply output at J1' and J2' so that the electronic power supply senses an adequate load to energize itself. To increase the efficiency of the voltage rectification, Schottky diodes D1', D2', D3', and D4' having a low $V_f$ (approximately 0.25 volts) are provided.

Filter capacitors C1' through C9' are preferably tantalum and have a Mean Time Between Failure (MTBF) of the same order of magnitude as MTBF for a typical LED array, such as LED array LED1' through LED10'. R1' and R2' perform the same function as R1 and R2 of FIG. 3. However, the LED driver circuitry U1' is further protected from AC transient inputs by capacitor C14' in parallel with resistors R1' and R2'.

Inputs 1' through 6' of LED driver circuitry U1' are configured similarly to the connections in FIG. 3. However, in addition to thermal runaway protection as provided by shunt regulator U2' and associated resistor circuitry R4', R5' (thermistor), and R6', the LED lamp circuitry as shown in FIG. 4 is protected from voltage runaway conditions via R7' R8', C10' and transistor Q2', the output of which is also connected to dimmer input DIM (pin 3'). Q2' has a pullup resistor R3', while the VCC input of driver U1' has a pullup resistor R10'. DC isolation from ground is provided by capacitor C12'.

Regulator/LED driver U1' output DRV (pin 6') is routed to gate of N channel MOSFET Q1' the output of which feeds diode D5' to provide a regulated input voltage VIN for the LED array LED1'-LED10'. C11' is disposed in parallel with the LED array and provides additional voltage smoothing to counteract any voltage differences that may arise between the two array arms LED1'-LED5' and LED6'-LED10'. Inductor L1' functions in conjunction with C1'-C9' to provide additional DC ripple filtering. However, since L1' is disposed between R1' and Q1', the inductance value may be reduced to approximately 50 µH, thereby maintaining a miniature form factor that is compatible with the MR-16 lamp form factor.

Figure 5:
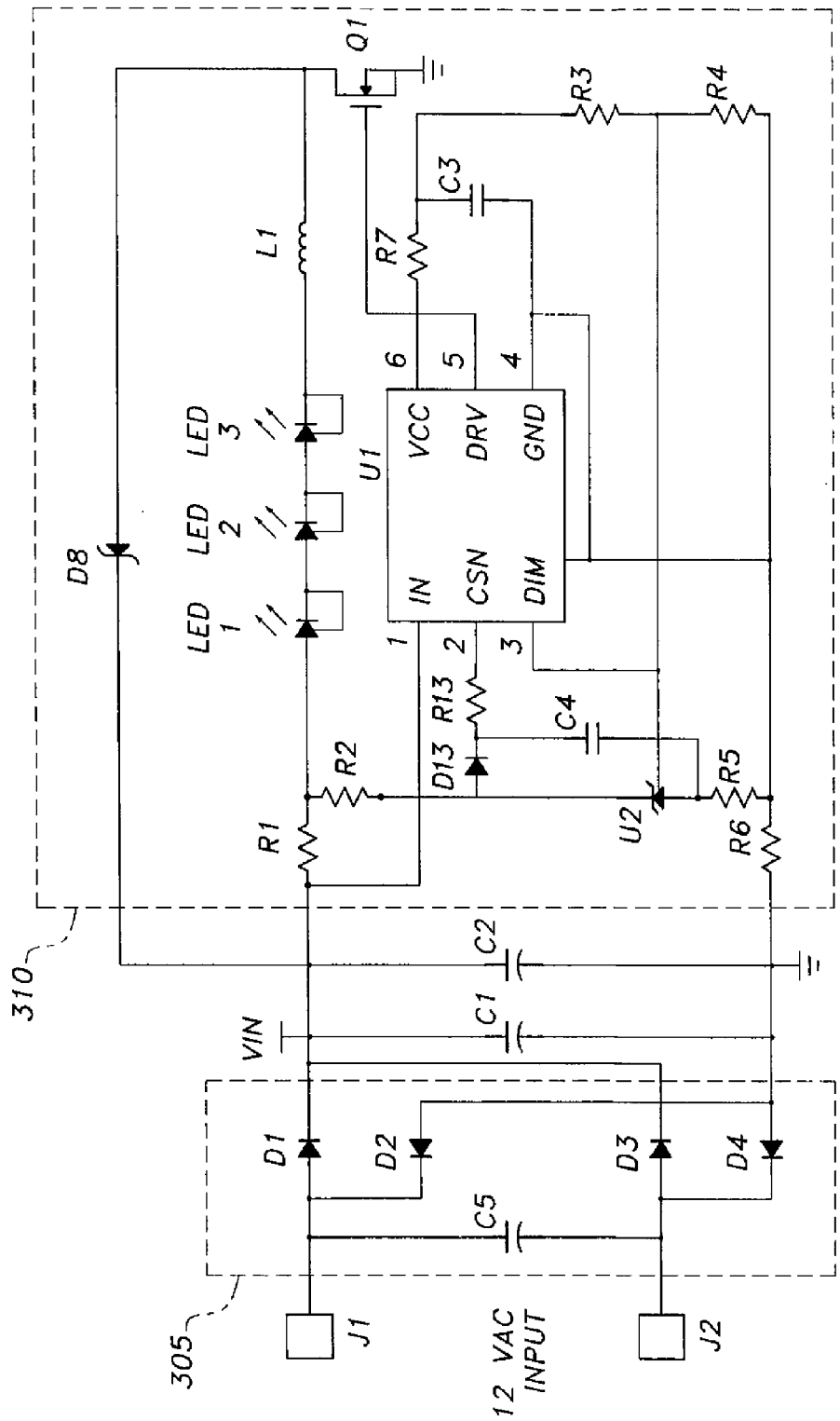
FIG. 5 is a schematic diagram of a third embodiment of driver circuitry for an LED replacement for low voltage lamps according to the present invention that provides for dimmer compensation.

Referring to FIG. 5, the LED replacement for low voltage lamps may include dimmer compensation circuitry formed by diode D13, resistor R13, and capacitor C4. This dimmer compensation circuitry allows for flicker-free dimming with the use of a low voltage electronic power supply and an electronic low voltage dimmer. Trailing edge dimmers chop the AC waveform at the beginning of the 60 Hz cycle, which does not supply enough voltage at low dimming levels to keep the drive chip U1 MAXI 6820 (or equal) alive or awake. This affects the output of the LEDs by abruptly reducing the current to the LEDs each time the drive chip "falls asleep". This on-off cycling of the LED output becomes noticeable as a trembling and a flicker as the voltage to the chip is dimmed to below 8 VDC. The dimming compensation circuitry is connected to the CSN and DIM inputs of driver U1.

FIG. 5 is substantially identical to FIG. 3, except for the addition of resistor R13 at pin 2 of the drive chip U1 and the addition of diode D13 connected between capacitor C4 and the shunt regulator U2. The diode D13, resistor R13 and capacitor C4 are an exemplary configuration connected to drive chip U1 that accomplishes the required dimmer compensation to avoid lamp flicker during the dimming process. This dimmer compensation circuit allows the LED MR16 to dim flicker-free with a trailing edge dimmer by allowing the capacitor C4 to be continually fed current from the main branch after the ripple capacitors so that capacitor C4 receives 12 VDC continually and stores it. The capacitor C4 delivers the current to the drive chip U1, ensuring that voltage never drops to a critical level even when dimming levels are extremely low.

Moreover, the diode D13 acts as a one-way valve and ensures that when the capacitor C4 is discharging, current does not feed back into the main circuit.

Additionally, the value of resistor R13 may be calculated to ensure that the capacitor C4 does not discharge too quickly, i.e., R13 and C4 form an R-C circuit in which the capacitor C4 retains sufficient remaining charge to keep the chip U1 "awake" during the low voltage cycle. Moreover, the value of resistor R13 may be selected so that resistor R13 protects the chip U1 from receiving excessive drive current.

It is to be understood that the present invention is not limited to the embodiments described above, but encompasses any and all embodiments within the scope of the following claims.

We claim:

1. An LED replacement for low voltage lamps, comprising:
   a housing;
   a plurality of light emitting diodes disposed in the housing;
   a translucent, reflective lens disposed on the housing, the translucent, reflective lens focusing light emissions from the light emitting diodes away from the housing;
   lamp-energizing electrical contacts disposed at the back of the housing;
   voltage rectification-voltage regulation LED driver circuitry, the voltage rectification-voltage regulation LED driver circuitry accepting as input a low voltage alternating current from a transformer and producing a constant current regulated voltage responsive thereto as output to the LEDs;
   a ceramic capacitor electrically connected across the low voltage alternating current input, the ceramic capacitor providing an adequate load to the transformer to cause the transformer to energize the input;
   thermal protection circuitry connected to the voltage rectification-voltage regulation LED driver circuitry, the thermal protection circuitry throttling back power to the light emitting diodes as the LED lamp exceeds a predetermined threshold temperature;
   a pair of zener diodes in parallel with the ceramic capacitor at the low voltage alternating current input, the zener diodes having their respective anodes connected together and their respective cathodes connected to respective terminals of the low voltage alternating current input; and
   a dimmer compensation circuit connected between the thermal protection circuitry and the voltage rectification-voltage regulation LED driver circuitry for providing sufficient voltage to the LED driver circuitry to maintain the light emitting diodes flicker-free when the thermal protection circuitry throttles back power to the light emitting diodes.

2. The LED replacement according to claim 1, wherein the housing is compatible with an MR-16 form factor.

3. The LED replacement according to claim 1, wherein the voltage rectification circuitry comprises a plurality of diodes in a full-wave rectification configuration.

4. The LED replacement according to claim 1, further comprising a Schottky diode electrically disposed at the output of a voltage regulator/driver portion of the voltage rectification-voltage regulation LED driver circuitry.

5. The LED replacement according to claim 1, further comprising dimming compensation circuitry connected to a dimming input of said rectification-voltage regulation LED driver circuitry.

6. The LED replacement according to claim 1, wherein the voltage rectification portion of the LED driver circuitry further comprises a plurality of tantalum capacitors electrically disposed in parallel across the rectifier output.

7. The LED replacement according to claim 1, wherein the thermal protection circuitry has a configuration for pulse width modulation dimming.

8. The LED replacement according to claim 1, wherein the thermal protection circuitry is configured for linear dimming.

9. The LED replacement according to claim 1, wherein the plurality of light emitting diodes is electrically disposed in parallel rows, a smoothing capacitor being disposed in parallel across the rows of LEDs.

10. The LED replacement according to claim 1, wherein the ceramic capacitor has a value that is approximately 0.015 uF at approximately a 50-volt rating.

11. The LED replacement according to claim 1, wherein the pair of zener diodes provides an approximately 19-volt clipping action.

12. An LED replacement for low voltage lamps, comprising:
   a housing;
   a plurality of light emitting diodes disposed in the housing;
   a translucent, reflective lens disposed on the housing, the translucent, reflective lens focusing light emissions from the light emitting diodes away from the housing;
   lamp-energizing electrical contacts disposed at the back of the housing;
   voltage rectification-voltage regulation LED driver circuitry, the voltage rectification-voltage regulation LED driver circuitry accepting as input a low voltage alternating current from a transformer producing a constant current regulated voltage responsive thereto as output to the LEDs, wherein voltage regulator/driver portion of the voltage rectification-voltage regulation LED driver circuitry comprises approximately 2 MHz high-brightness LED drivers having high-side current sense and approximately 5000:1 dimming;
   a ceramic capacitor electrically connected across the low voltage alternating current input, the ceramic capacitor providing an adequate load to the transformer to cause the transformer to energize input;
   thermal protection circuitry connected to the voltage rectification-voltage regulation LED driver circuitry, the thermal protection circuitry throttling back power to the light emitting diodes as the LED lamp exceeds a predetermined threshold temperature; and
   a dimmer compensation circuit connected between the thermal protection circuitry and the voltage rectification-voltage regulation LED driver circuitry for providing sufficient voltage to the LED driver circuitry to maintain the light emitting diodes flicker-free when the thermal protection circuitry throttles back power to the light emitting diodes.

13. An LED replacement for low voltage lamps, comprising:
   a housing;
   a plurality of light emitting diodes disposed in the housing;
   a translucent, reflective lens disposed on the housing, the translucent, reflective lens focusing light emissions from the light emitting diodes away from the housing;

lamp-energizing electrical contacts disposed at the back of the housing;

voltage rectification-voltage regulation LED driver circuitry, the voltage rectification-voltage regulation LED driver circuitry accepting as input a low voltage alternating current from a transformer and producing a constant current regulated voltage responsive thereto as output to the LEDs;

a ceramic capacitor electrically connected across the low voltage alternating current input, the ceramic capacitor providing an adequate load to the transformer to cause the transformer to energize the input;

thermal protection circuitry connected to the voltage rectification-voltage regulation LED driver circuitry, the thermal protection circuitry throttling back power to the light emitting diodes as the LED lamp exceeds a predetermined threshold temperature, wherein the thermal protection circuitry has a configuration that initiates power throttleback at approximately 60° C., the configuration being characterized by a throttling back gradient cutting the power by 50% at approximately 85% of the maximum allowable temperature; and a dimmer compensation circuit connected between the thermal protection circuitry and the voltage rectification-voltage regulation LED driver circuitry for providing sufficient voltage to the LED driver circuitry to maintain the light emitting diodes flicker-free when the thermal protection circuitry throttles back power to the light emitting diodes.

\* \* \* \* \*